(12) United States Patent
Saito

(10) Patent No.: US 11,822,833 B2
(45) Date of Patent: Nov. 21, 2023

(54) SYSTEM, METHOD, AND CONTROL METHOD

(71) Applicant: CANON KABUSHIKI KAISHA, Tokyo (JP)

(72) Inventor: Wataru Saito, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/873,382

(22) Filed: Jul. 26, 2022

(65) Prior Publication Data
US 2023/0042494 A1     Feb. 9, 2023

(30) Foreign Application Priority Data

Aug. 3, 2021   (JP) ................................ 2021-127734

(51) Int. Cl.
    *G06F 3/12*          (2006.01)
(52) U.S. Cl.
    CPC .......... *G06F 3/1208* (2013.01); *G06F 3/1256* (2013.01); *G06F 3/1288* (2013.01)
(58) Field of Classification Search
    CPC .... G06F 3/1208; G06F 3/1256; G06F 3/1288; G06F 3/1204

USPC ......................................................... 358/1.15
See application file for complete search history.

(56) References Cited

U.S. PATENT DOCUMENTS

2017/0163850 A1*   6/2017   Heeter ................. H04N 1/6052

FOREIGN PATENT DOCUMENTS

JP           2002209164 A      7/2002

* cited by examiner

*Primary Examiner* — Darryl V Dottin
(74) *Attorney, Agent, or Firm* — Venable LLP

(57) ABSTRACT

A client, based on image data to be printed obtained from a Web application, generates preview image data for which a first color-conversion process for causing a display on a display unit is performed, and based on the preview image data, causes first preview image to be displayed on a display unit, and transmits to a server image data to be printed. The server, based on the image data to be printed, generates color-converted image data for which a second color-conversion process printing on a printing device is performed. In the client, based on the color-converted image data being generated, causes a second preview image to be displayed based on the color-converted image data instead of the preview image data.

21 Claims, 7 Drawing Sheets

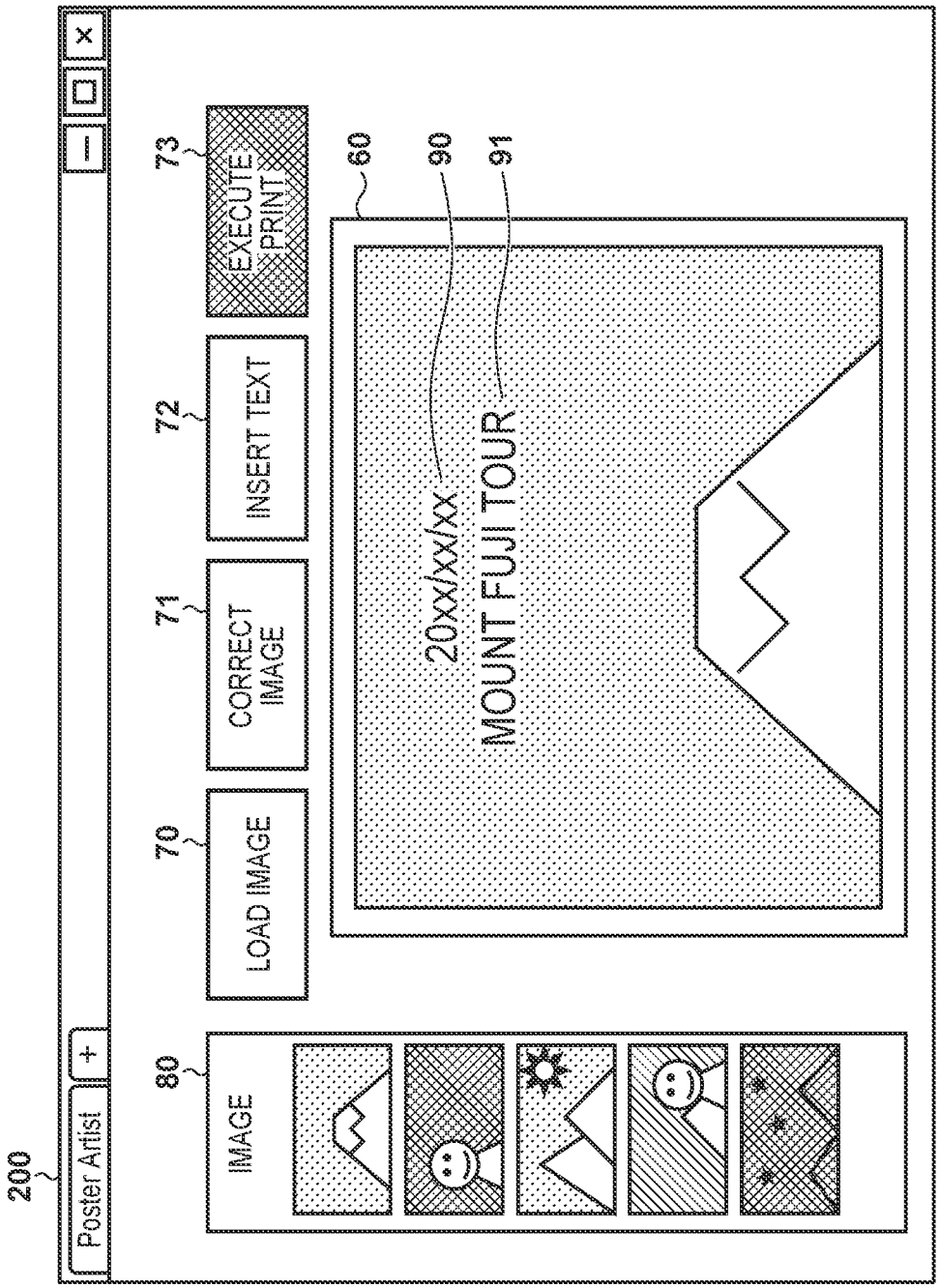

SYSTEM, METHOD, AND CONTROL METHOD

BACKGROUND OF THE INVENTION

Field of the Invention

The present invention relates to a system including a client and a server, a method, and a control method.

Description of the Related Art

With a Web browser, Web applications running on the Web browser can be used regardless of conditions such as the type of the terminal (for example PC or smartphone), the type of the operating system (OS), or the hardware configuration. In general, a Web application is configured to include a client and a server. The actual client is Hypertext Markup Language (HTML) and JavaScript programs or the like operating on the Web browser (client side). The actual server is a program that runs on a Web server (server side). The client side and server side communicate mainly over the Internet. When a Uniform Resource Locator (URL) for starting a Web application is entered into a Web browser, the server side delivers a client-side program to the Web browser. Then, the Web application is executed by the client side running on the Web browser.

Some Web applications are for the purpose of processing images, creating posters and photo albums using photographs, and the like, and in such Web applications, images for accepting selection for a layout on a screen, images for a preview display, and the like are displayed. When a large-sized image is displayed, it may take time to complete the image display, and therefore, a thumbnail image where the image has been resized to be smaller is generally created and displayed. Japanese Patent Laid-Open No. 2002-209164 describes creating a thumbnail image and a preview image for enlarged display on the server side to deliver to the client side and displaying the thumbnail image and preview image on a screen on a Web browser.

Meanwhile, a thumbnail image may be created and displayed on the client side. Some Web browsers have a color management function that displays images based on an ICC profile (color profile) embedded in the image or a monitor profile suited to the monitor. In those Web browsers, for example, when an image containing an AdobeRGB ICC profile is displayed on a monitor of an sRGB monitor profile, the image is converted into the sRGB color space whose color gamut is narrower than the AdobeRGB color space and then displayed.

SUMMARY OF THE IN

The present invention provides a system, method, and control method for preventing an unintentional difference between a tone of an image displayed as a preview on a screen in a client and a tone of an image of a printed material.

The present invention in one aspect provides a system comprising a client that includes a Web browser and a server operable to provide a function of a Web application to the client, wherein the client comprises an obtainment unit configured to obtain image data to be printed from the Web application; a first generation unit configured to, based on the image data to be printed obtained by the obtainment unit, generate preview image data for which a first color-conversion process for causing a display on a display unit is performed; a display control unit configured to cause a first preview image to be displayed on the display unit based on the preview image data generated by the first generation unit; and a first transmission unit configured to transmit to the server the image data to be printed, and the server comprises a second generation unit configured to, based on the image data to be printed transmitted by the first transmission unit, generate color-converted image data for which a second color-conversion process for printing by a printing device is performed, and the display control unit, based on the color-converted image data generated by the second generation unit being received by the client, causes a second preview image to be displayed based on the color-converted image data.

According to the present invention, it is possible to prevent an unintentional difference between a tone of an image displayed as a preview on a screen in a client and a tone of an image of a printed material.

Further features of the present invention will become apparent from the following description of exemplary embodiments with reference to the attached drawings.

BRIEF DESCRIPTION OF THE DRAWINGS

FIG. 7 is a view illustrating a user interface screen of a Web application.

DESCRIPTION OF THE EMBODIMENTS

Figure 1:
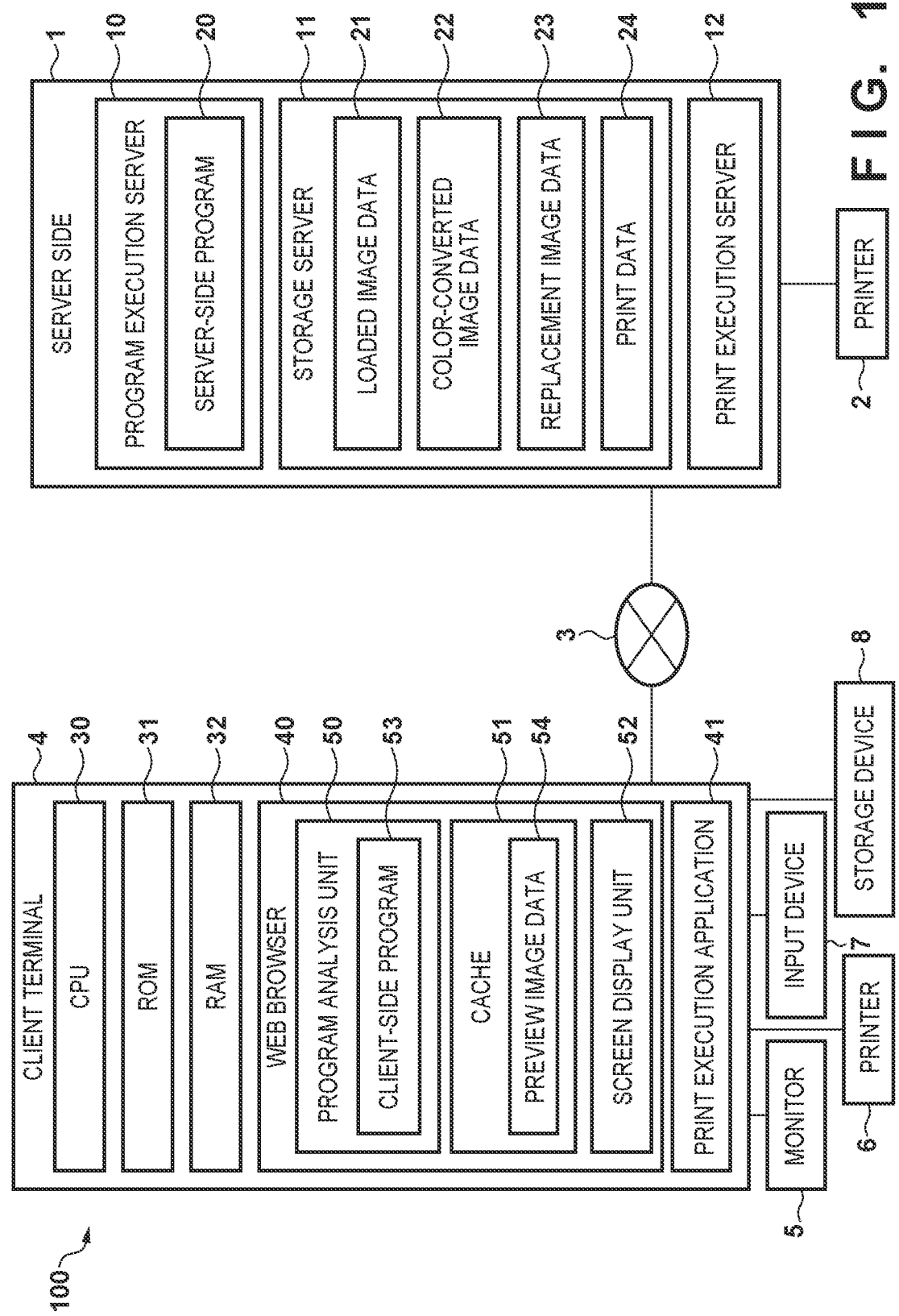
FIG. 1 is a view illustrating a configuration of an information processing system.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

For example, in a Web application, data for a layout of a poster or a photo album or the like created by arranging images on the client side is converted to print data on the server side and printed. In such a case, a tone of an image displayed as a preview on a screen on the client side and a tone of an image of a printed material may differ unintentionally.

According to the present disclosure, it is possible to prevent an unintentional difference between a tone of an image displayed as a preview on a screen in a client and a tone of an image of a printed material.

First Embodiment

FIG. 1 is a diagram showing an example of a configuration of an information processing system 100 according to the present embodiment. A server side 1 that performs server processing is a server that can provide a Web application, and includes a program execution server 10, a storage server 11, and a print execution server 12. Further, the server side 1 includes an input/output interface (not shown) for connecting to a printer 2 and a network 3 such as the Internet. The program execution server 10 executes a server-side program 20 which is a program that operates on the server side 1. The storage server 11 stores images transferred from the client side, image files created by a program on the server side 1, print data files, and the like. The print execution server 12 transmits the print data created by the Web application to the printer 2 connected to the server side 1 and performs printing. The program execution server 10, the storage server 11, and the print execution server 12 may be implemented by physically separate devices or may be implemented in a single device. Further, although not shown, the server side 1 includes a processor for comprehensively controlling the device such as a CPU, a memory such as a ROM and a RAM, and a storage unit such as a hard disk. The operation of the server side 1 in the present embodiment is realized by the coordination of hardware elements and programs. The hardware elements may include the program execution server 10, the storage server 11, and the print execution server 12.

A client terminal 4, which is a mobile terminal such as a PC or a smartphone operated by a user, comprises a CPU 30, a ROM 31, and a RAM 32. Further, the client terminal 4 includes an input/output interface (not shown) for connecting to a monitor 5, a printer, 6, an input device 7, a storage device 8, and the network 3. The CPU 30 is a central processing unit and controls the entire client terminal 4 by executing an OS stored in the storage device 8, the ROM 31, or the RAM 32. The CPU 30 can also execute a Web browser 40, a print execution application 41, or another program stored in the ROM 31 or the RAM 32. Thus, for example, each function of the client terminal 4 is realized by processing and outputting data based on input data and controlling hardware. The ROM 31 is a read-only memory in which programs are stored. The RAM 32 is a non-volatile random access memory, for example, used as a work memory for the CPU 30.

The Web browser 40 is for browsing Web sites on the Internet and running Web applications. When executing the Web application, a client-side program 53 is received from the server side 1 and a program analysis unit 50 that interprets HTML and a script language such as JavaScript is executed. The client-side program 53 is sometimes referred to as the client side below. The Web browser 40 also includes a cache 51 for holding preview image data 54, temporary data, and the like created during execution of the Web application. The Web browser 40 includes a screen display unit, and displays a preview image or the like on the monitor 5. A print execution application 41 transmits print data created by the Web application to the printer 6 connected to the client terminal 4 directly or by network and thereby performs printing.

The Web application is, for example, an application that lays out image data such as a photograph to be printed and prints it on a printer. In a Web application, on the server side, a process of color-convening, into print data, layout data such as a poster or a photo album or the like created by arranging image data on the client side is performed and then the print data is printed. In such a case, a tone of an image displayed as a preview on a screen on the client side and a tone of an image of a printed material may differ. An example in which such a phenomenon occurs will be described.

For example, assume a configuration in which the client side creates a preview image, the server side creates print data, and the printer prints in an sRGB color space In such a configuration, when image data defined in the AdobeRGB color space is used, the above-described phenomenon occurs under the following conditions. In a first condition, color management is supported only on the server side. In such cases, the preview image on the Web browser is not displayed in an appropriate tone, so the tone of the preview image differs from that of the printed material printed in sRGB. In a second condition, color management is supported only on the client side. In this case, the preview image will be displayed in an appropriate tone, but the printed matter will not be color-converted properly, so each tone will be different. In a third condition, both sides support color management and the monitor profile is AdobeRGB. In such cases, the preview display is in the AdobeRGB color gamut, so the tone differs from the print results printed in sRGB. In a fourth condition, the execution results of the respective color management are different. If the monitor is sRGB, the conversion in both cases is into the sRGB color space, but if there is a difference in the color management execution results, the tone of the preview image and the printed matter will be different.

In the present embodiment, the display is performed on the client side based on the print data that has been color-converted on the server side. With such a configuration, since the tone recognized by the user as the preview image is based on the print data after the color conversion, it is possible to suppress the difference in the tone generated between the preview image created on the client side and the result of executing printing on the server side.

Hereinafter, processing for suppressing a difference in tone between a preview image and a print result will be described with reference to FIGS. 1 to 3.

Figure 2:
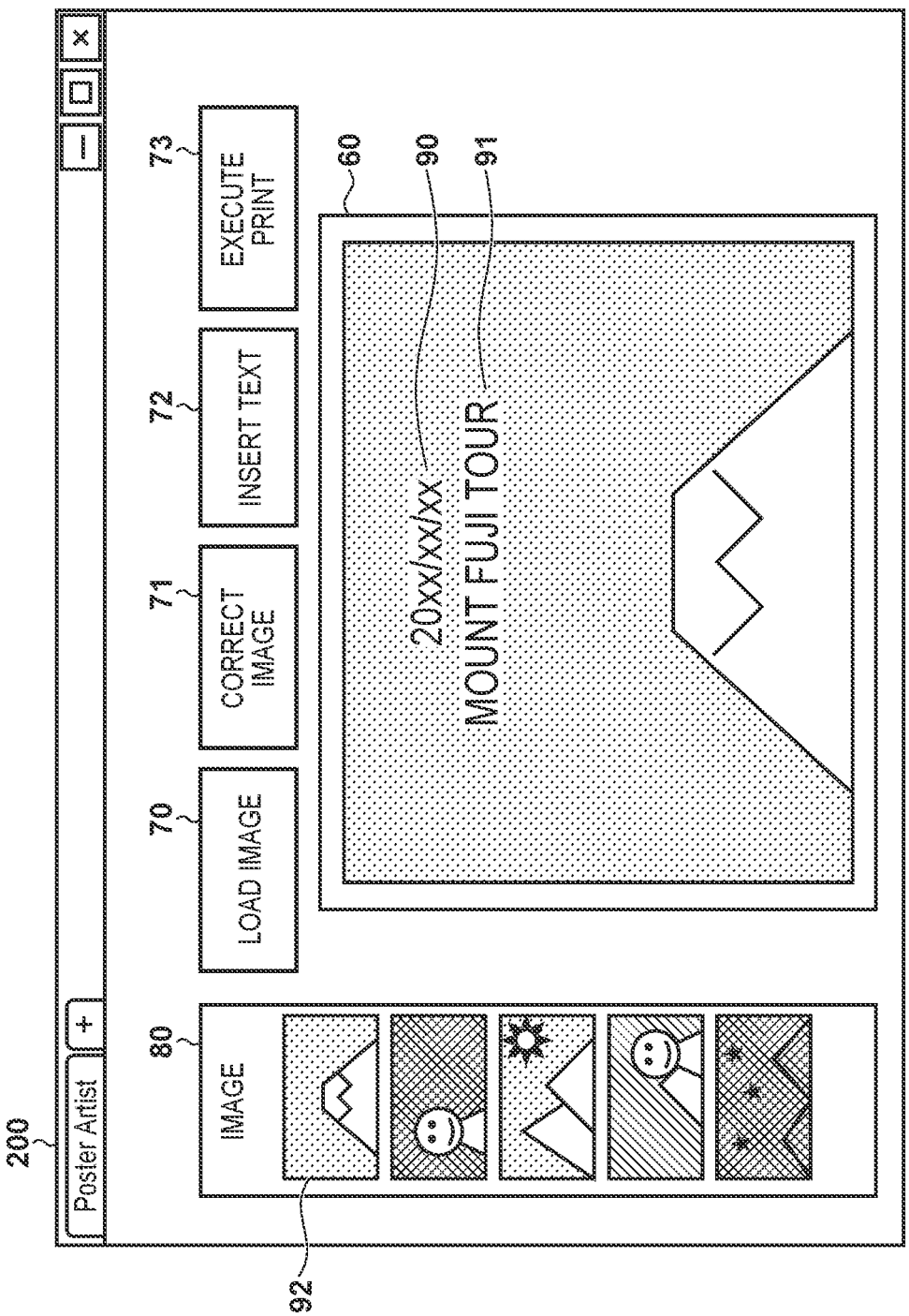
FIG. 2 is a view illustrating a user interface screen of a Web application.

FIG. 2 is a diagram illustrating an example of a user interface screen (UI screen) of a Web application that creates a poster or a photo album and operates in the Web browser 40. The Web application is started by inputting a URL for starting the Web application into the Web browser 40. When a URL is entered into the Web browser 40, the server side 1 sends the client-side program 53 to the Web browser 40. Then, by executing the client-side program 53 received by the Web browser 40, the Web application is started, and thereafter, processing based on the user operation is executed.

FIG. 2 is a diagram illustrating an example of a UI screen displayed when a Web application is operated. In a preview region 60 of a screen 200, a user's layout operation, such as an adjustment of the position of an image or a text object, may be accepted. When a user operation such as a click is performed on a button 70, a function for loading image data such as a photograph designated by the user into the Web application is executed. Further, by performing a user operation such as a click on a button 73, a function for transmitting the image data and the layout result edited by the Web application to the server side 1 to perform printing is executed.

A region 80 is a region for displaying a list of images loaded in the Web application as thumbnail images. FIG. 2 shows a state in which five images have been loaded. For example, when user operations such as clicking or dragging and dropping a thumbnail image onto the preview region 60 are performed, the designated image data is laid out on the preview region 60. An image 91 shows a state in which a thumbnail image 92 selected in the region 80 is laid out in the preview region 60.

A user operation, such as a click, is performed on the button 72 to perform a function of laying out a text object. Text 90 illustrates a state in which a user-designated text object is laid out in the preview region 60. By performing a user operation such as a click on the button 71, a function for correcting the image data laid out on the preview region 60 is executed. Image corrections that are executed include, for example, correction of brightness or correction of color tone.

Next, display control processing up until printing is performed using image data such as a photograph designated by the user by the Web application as described above will be described with reference to the flowchart of FIG. 3. The process shown in FIG. 3 is started, for example, by a user performing a user operation such as a click on the button 70 of the screen 200 to select a photograph to be loaded.

In step S301, the client-side program 53 loads image data such as a photograph designated by a user. Image data that is not yet processed immediately after loading is called unprocessed image data hereinafter. The client-side program 53 loads image data corresponding to a photograph designated by the user from the image data group stored in the storage device 8 or the like of the client terminal 4, for example. In addition, the image data need not be stored in the client terminal 4 and it is also possible to obtain and load the image data from an external server other than the server side 1 that the client terminal 4 can access. The client-side program 53 stores the loaded image data in the cache 51 or the RAM 32. Alternatively, the client-side program 53 may upload the loaded image data to the storage server 11. In this case, when uploading a file to the storage server 11 or downloading a file from the storage server 11, a fixed URL prepared in advance may be used, or a new URL may be issued each time uploading is performed.

In step S302, the client-side program 53 creates the preview image data 54 based on the unprocessed image data for display in the region 80 or the preview region 60 based on the image data loaded in step S301. Here, for example, resizing to an appropriate size for display and color conversion based on an ICC profile embedded in an image to a monitor profile suited to the monitor are performed. This color conversion utilizes a color management function provided by the Web browser 40. Specifically, a resized image may be created in step S302 by, for example, rendering the unprocessed image data in an HTML <canvas> element and using a file output function provided in the <canvas> element. If the Web browser 40 supports color matching, color conversion is performed at the same time. The client-side program 53 may store the created preview image data 54 in the cache 51 or the RAM 32, and may upload the preview image data to the storage server 11. FIG. 1 illustrates that preview image data 54 is stored in the cache 51. Further, the preview image data 54 may be stored in the RAM 32 as memory data rather than as a file, or may be converted into a Base64 character string and stored.

In step S303, the client-side program 53 displays the preview image data 54 created in step S302 on the UI screen 200. At this time, the thumbnail image of the loaded image data may be displayed in the region 80 only, or may also be simultaneously displayed on the preview region 60. Here, methods of displaying an image on the region 80 and the preview region 60 will be described. As a first method, if the preview image data 54 is stored in the cache 51 or the RAM 32 in step S302, the image is displayed using an HTML <iing> element. Specifically, the file path at which the saved preview image data 54 is stored is set in the src attribute of the <img> element. As a second method, if the preview image data 54 is uploaded to the storage server 11 in step S302, the URL of the upload destination is set in the src attribute of an HTML <img> element. Further, in the first method and the second method, instead of the <img> attribute, a <canvas> attribute may be used, and the image may be displayed by passing an image object using a scripting language such as JavaScript.

In step S304, the client-side program 53 transfers the unprocessed image data to the storage server 11. Specifically, the client-side program 53 transmits the unprocessed image data using a Hypertext Transfer Protocol (HTTP) POST to a URL of the storage server 11. Hereafter, the unprocessed image data uploaded to the storage server 11 is referred to as loaded image data 21. If the image data loaded in step S301 is uploaded to the storage 11 and the server-side program 20 is in a state in which the loaded image data 21 can be accessed by a subsequent process, the processing of step S304 may be skipped.

After step S304 is processed, the server-side program 20 performs processing of step S390 and step S391 asynchronously from the client side. To start the processing in the server-side program 20, for example, the server side 1 may be provided with a Web API for executing the processing of the server-side program 20. Then, after the client-side program 53 completes the step S304 process, a Web API is called to start the process of the server-side program 20. Alternatively, the storage server 11 may be configured with a trigger process that causes the server-side program 20 to start processing when a file is uploaded to a predetermined URL of the storage server 11 or updated. In this case, the client-side program 53 uploads the unprocessed image data file in step S304 to a predetermined URL of the storage server 11, thereby starting a process of the server-side program 20. While the processing of step S390 to step S391 is being performed, the client side accepts user operations other than the print instruction, such as the image correction and layout setting, on the UI screen 200, for example.

In step S390, the server-side program 20 generates image data in which the unprocessed image data transmitted in step S304 is converted into a color space that can be output by the printer 2. In this example, the data is converted into sRGB which ordinary monitors and printers can output. Specifically, for example, the server-side program 20 decodes the image data with an image decoder capable of interpreting the ICC profile, and converts the image data into the sRGB color space by encoding the decoded image data with an image encoder capable of outputting sRGB. The image data converted into the color space of sRGB may be stored in a memory of the server-side program 20 or may be stored in a file and uploaded to the storage server 11. Hereafter, the color-converted image data is referred to as the color-converted image data 22. Although it is desirable not to resize the color-converted image data 22, it may be resized if the size does not fall below a resolution required at the time of printing.

In step S391, the server-side program 20 creates image data for replacing the client-side preview image data 54 based on the image data color-converted in step S390. Hereafter, the image data for replacement is referred to as replacement image data 23. The replacement image data is uploaded to the storage server 11 which is accessible to the client-side program 53. The format of the file at this time may be an image file format or text string data converted into Base64. The server-side program 20 resizes the replacement image data 23 to the same size as the preview image data 54.

When the processing of step S391 is completed, the asynchronous process of the server-side program 20 is terminated.

When step S304 is completed, the client-side program 53 waits in step S305 to detect completion of creation of the replacement image data 23. Specifically, a Web API for querying the server side 1 as to the completion of creation of the replacement image data 23 is provided, and the client-side program 53 periodically calls the Web API. Further, a WebSocket mechanism may be used to send a notification of completion of creation of the replacement image data 23 from the server side 1 to the client-side program 53. When the second method described in step S303 is used, HTML may be regularly reloaded, or the <img> element or the <canvas> element used to display the screen may be reloaded periodically using a scripting language such as JavaScript. In such a configuration, since the image data is replaced if the creation of the replacement image data 23 has been completed and the image data has been uploaded to the storage server 11, the client-side program 53 can detect the completion of creation of the replacement image data 23. These detection processes are performed in the background or by using a tinier event so that the user can continue operating the Web application.

In step S306, the client-side program 53 displays the replacement image data 23 on the screen after replacing the preview image data 54 displayed in step S303. When the target image is laid out in the preview region 60, the image on the preview region 60 is also replaced. Specifically, when the first display method described in step S303 is used, the replacement image data 23 is downloaded from the storage server 11, and the path of the replacement image data 23 is set in an HTML <img> attribute or <canvas> attribute and thereby the replacement image data 23 is displayed. When the second display method described in step S303 is used, HTML may be regularly reloaded, or the <img> element or the <canvas> element used to display a screen may be reloaded periodically using a scripting language such as JavaScript, to thereby replace the image being displayed in the preview.

In step S307, the client-side program 53 instructs the server side 1 to print in response to a user operation. Specifically, after the layout operation is completed, a user operation such as a click is performed on the button 73 to instruct the execution of printing. At this time, the client-side program 53 transmits the content of the layout data directly to the server side 1 with an HTTP POST or uploads it to the storage server 11.

In step S308, the server-side program 20 creates data in a format that can be printed by the printer 2 based on the layout data transmitted or uploaded in step S307. Hereafter, data in a form that can be printed by the printer 2 is referred to as print data 24. When the layout data includes image data, the print data 24 is created using the color-converted image data 22. The print data 24 may be in a data format that can be printed directly by the printer 2 or may be in a data formal that can be interpreted by a program such as a device driver that controls the printer 2. The print data 24 may be a document file format such as PDF or an image format such as JPEG. The print data 24 may be directly transmitted to a printer connected by a network such as the printer 6 or may be uploaded to the storage server 11.

In step S309, the printer 2 itself or a server or application (illustrated as printing device) that controls the printer 2 or the printer 6 performs printing. For example, when the server-side program 20 directly transmits the print data 24 to the printer 6 in step S308, the printer 6 prints the received print data 24. Alternatively, when the server-side program 20 uploads the print data 24 to the storage server 11 in step S308, the print execution application 41 may download the print data 24 from the storage server 11 and execute printing on the printer 6. The print execution server 12 included on the server side 1 may download the print data 24 from the storage server 11 and execute printing on the printer 6. When the print is executed by step S309, the process of FIG. 3 is finished.

As described above, in the present embodiment, when a preview image based on unprocessed image data is displayed in step S303 and the user operation is accepted, replacement image data is created by performing a color-space conversion on the unprocessed image data in step S390 and in step S391. When the replacement image data is created, the display is replaced with the replacement image data in step S306 and the preview image data is displayed, and when a print execution instruction is issued, the print data is generated using the replacement image data.

The preview image replacement in step S306 may differ in tone from the preview image prior to the replacement. This is the case, for example, when the outcome of the color management on the client side in step S302 differs from the result of the color management on the server side 1 in step S390. The replacement image data color-converted in step S390 and displayed in step S306, is not color-converted to suit the monitor, and the tone that will be printed is displayed. Therefore, the user can execute the printing after seeing the tone that will be printed.

Second Embodiment

Hereinafter, a second embodiment will be described with reference to points different from the first embodiment. When performing the process of step S304 of FIG. 3, if it is clear that the tone of the replacement image data 23 will match with the preview image data. 54 created on the client side, the loaded unprocessed image data need not be transmitted to the server side 1 in step S304. In the present embodiment, using the predetermined test image data, the server side 1 determines whether or not the tone of the preview image data created on the client side will match the tone of the replacement image data created on the server side 1, and the determination result is transmitted to the client side. The client side controls transmission of the unprocessed image data to the server side 1 according to the determination result.

Figure 3:
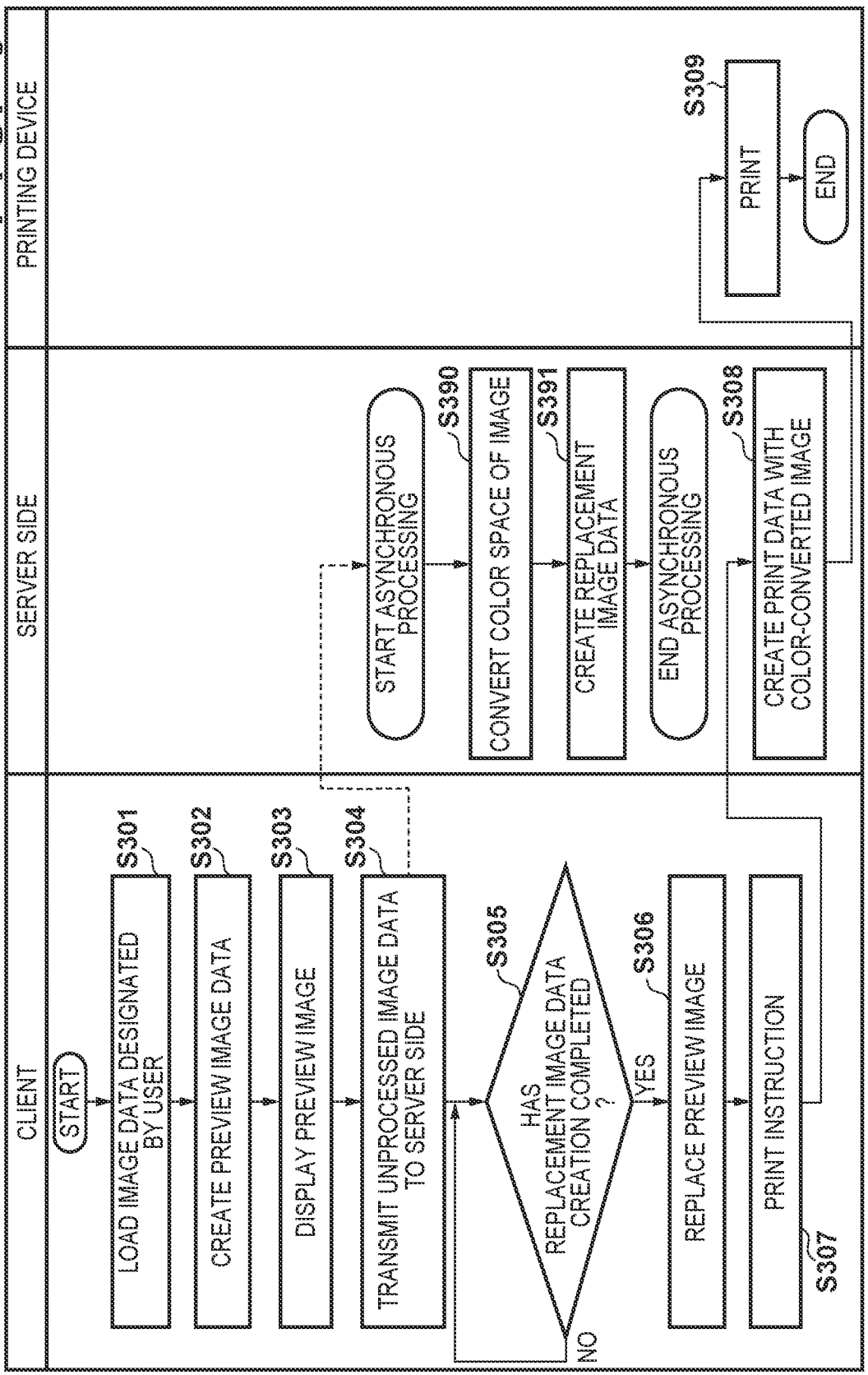
FIG. 3 is a flowchart illustrating processing from when image data is loaded until when printing is performed.
Figure 4:
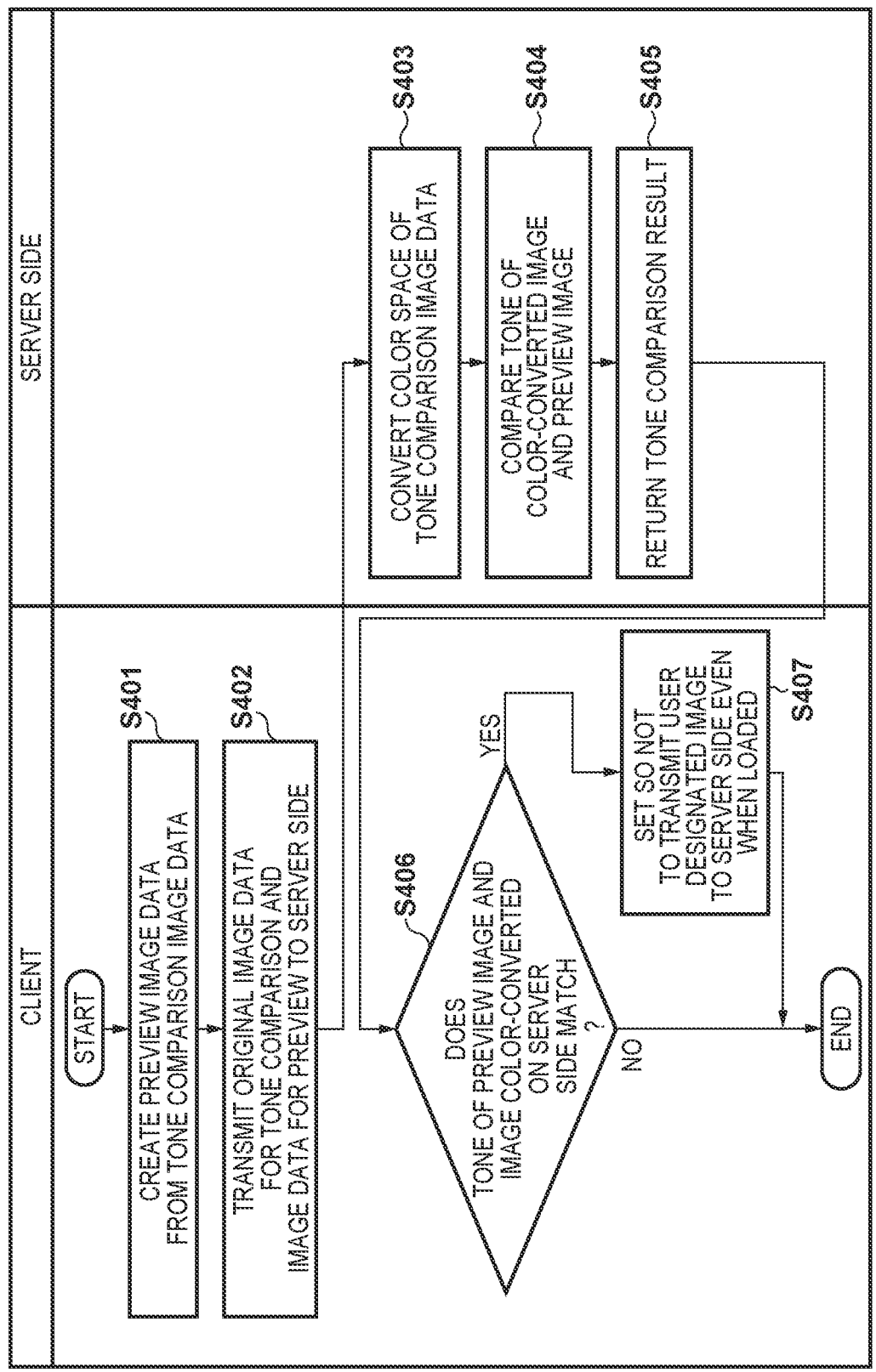
FIG. 4 is a flowchart illustrating a process for determining a difference in tone.

FIG. 4 is a flowchart showing a process of determining a difference in tone before the process of FIG. 3 is started, for example, at an arbitrary timing such as when a Web application is started. In step S401, the client-side program 53 creates preview image data (test preview image data) as in step S302 in the first embodiment from predetermined image data (test image data) for comparing tone. That is, color conversion based on the ICC profile embedded in the image and the monitor profile suited to the monitor is performed, and when the Web browser 40 supports color matching, color conversion is performed simultaneously. In this case, resizing is not performed in the present embodiment. The predetermined image data for comparing the tone is data corresponding to the unprocessed image data in the process of FIG. 3, and is data including a test pattern of a predetermined tone. The predetermined image data for comparing the tone includes at least R=0, G=0, and B=0 pixels and R=255, G=255, and B=255 pixels in the 24-bit RGB color model. In addition, it is desirable that the size be small, such as 256 pixels in the vertical direction and 256 pixels in the horizontal direction. Predetermined image data for comparing tone may be generated by the client-side program 53, stored in advance in the storage server 11, and downloaded therefrom by the client-side program 53. The predetermined image data for tone comparison and the generated preview image data may be stored in the cache 51 or the RAM 32, and may be uploaded to the storage server 11.

In step S402, the client-side program 53 transmits the predetermined image data for comparing tone and the generated preview image data to the server side 1. At this time, the data may be transmitted by an HTML POST or may be uploaded to a region of the storage server 11 that the server-side program 20 can access.

In step S403, the server-side program 20 performs a color conversion of an image for tone comparison based on predetermined image data for comparison of tone transmitted in step S402. The color conversion of an image for tone comparison is performed similarly to step S390 of the first embodiment. In this case, resizing is not performed in the present embodiment. Incidentally, a method of starting the server-side program 20 may be performed by installation and calling of the Web API in the first embodiment. With such a configuration, the time to the response can be shortened, and reception of the response data can be simplified.

In step S404, the server-side program 20 compares the tone of the image data that has been color-converted in step S403 with the tone of the test preview image data created in step S401. For example, the server-side program 20 compares the RGB values of each pixel of the respective data, and if the values match, it is determined that the tone matches. At this time, it may be determined to be a match when, though not a perfect match, the difference between the RGB pixel values is within a predetermined range such as 2 or less.

In step S405, the server-side program 20 includes the result of comparing tone in step S404 in response data and returns the response to the calling client-side program 53. The tone comparison result may be, for example, statistical information representing the ratio at which the tone matches for each color of RGB.

In step S406, the client-side program 53 obtains and analyzes the result of comparing tone included in the response data, and determines whether or not the tone matches. In the determination, for example, if the match ratio exceeds a reference value for each of the RGB colors, it may be determined to be a match. If it is determined that the tone matches, the process proceeds to step S407. On the other hand, when it is determined that the tone does not match, the process of FIG. 4 is terminated. When the process of FIG. 4 ends without passing through step S407, the process of FIG. 3 will be performed as described in the first embodiment.

In step S407, the client-side program 53 makes a setting so that unprocessed image data is not to be transmitted to the server side 1 when the user-designated image data is loaded. For example, setting information such as a flag indicating that unprocessed image data is not to be transmitted to the server side 1 is held in the cache 51. Such configuration information is deleted when the Web application is terminated. After the processing of step S407, the processing of FIG. 4 ends. When the processing of FIG. 4 is completed via step S407, on the client side, after the processing of step S303, the process of step S307 is performed without performing the processing of step S304 to step S306 of FIG. 3.

As described above, before creating preview image data based on the user-designated image data, it is determined whether or not the preview image data created on the client side matches the tone of the replacement image data created on the server side based on predetermined test image data. When it is determined that the tone matches, the process of step S304 to step S306 of FIG. 3 is not performed, so that the amount of data communicated between the client side and the server side can be reduced.

Third Embodiment

Figure 5:
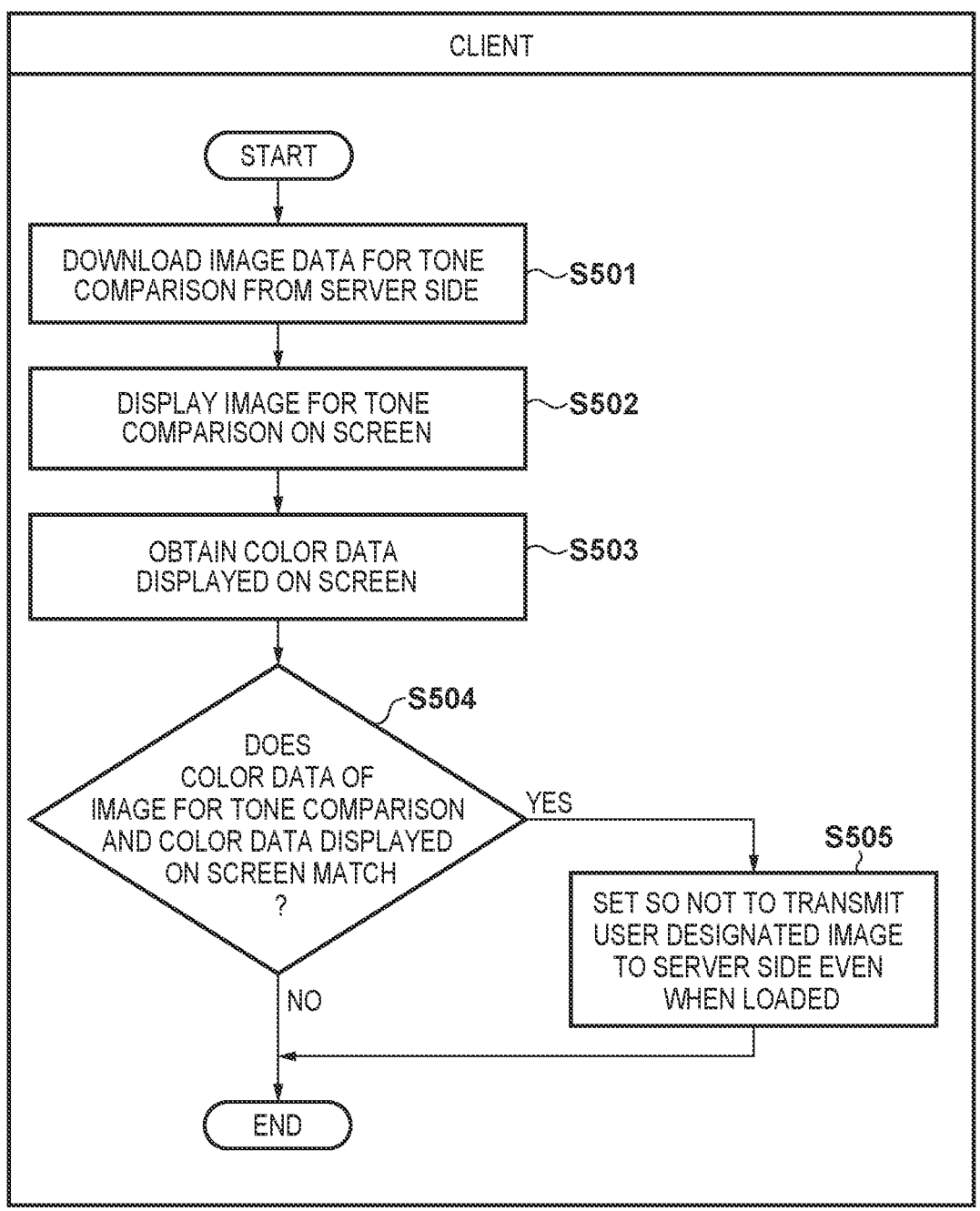
FIG. 5 is a flowchart illustrating a process for determining a difference in tone.

Hereinafter, a third embodiment will be described with reference to points different from the first and second embodiments. FIG. 5 is a flowchart showing a process of determining a difference in tone before the process of FIG. 3 is started, for example, at an arbitrary timing such as when a Web application is started.

In step S501, the client-side program 53 obtains predetermined image data (test image data) for comparing tone from the server side 1. For example, predetermined image data for comparing the tone is stored in advance in the storage server 11, and the client-side program 53 may be download the image data from there. The predetermined image data for comparing tone obtained in step S501 is data corresponding to the color-converted image data in the server side 1, and is data including a test pattern of a predetermined tone. The predetermined image data for comparing tone includes at least R=0, G=0, and B=0 pixels and R=255, G=255, and B=255 pixels in the 24-bit RGB color model. In addition, it is desirable that the size be small, such as 256 pixels in the vertical direction and 256 pixels in the horizontal direction.

In step S502, the client-side program 53 creates the preview image data (test preview image data) as in step S302 and step S303 in the first embodiment based on the predetermined image data for comparing tone, and performs display to the screen 200.

In step S503, the client-side program 53 obtains color data on the display of the screen 200 of the predetermined image data for comparing tone. Specifically, for example, a screen shot image of a screen display portion is obtained, and RGB values are obtained from the image. In addition, for example, the RGB values of the screen display may be obtained by using a function for outputting color data of an HTML <canvas>.

In step S504, the client-side program 53 compares the tone of the predetermined image data for comparing tone obtained in step S501 with the tone of the color data on the display obtained in step S503. For example, the client-side program 53 compares the RGB values of each pixel of the respective data, and if the values match, it is determined that the tone matches. At this time, it may be determined to be a match when though not a perfect match, the difference between the RGB pixel values is within a predetermined range such as 2 or less If it is determined that the tone matches, the process proceeds to step S505. On the other hand, when it is determined that the tone does not match, the process of FIG. 5 is terminated. When the process of FIG. 5 ends without passing through step S505, the process of FIG. 3 will be performed as described in the first embodiment.

In step S505, the client-side program 53 makes a setting so that unprocessed image data is not transmitted to the server side 1 when the user-designated image data is loaded. For example, setting information such as a flag indicating that unprocessed image data is not to be transmitted to the server side 1 is held in the cache 51. Such configuration information is deleted when the Web application is terminated. After the processing of step S505, the processing of FIG. 5 ends. When the processing of FIG. 5 is completed via step S505, on the client side, after the processing of step S303, the process of step S307 is performed without performing the processing of step S304 to step S306 of FIG. 3.

As described above, before creating preview image data based on the user-designated image data, it is determined whether or not the tone of the color-converted image data that has been color-converted on the server side based on the predetermined test image data matches the tone displayed on the client side for which color conversion suited to the monitor has been performed based on the color-converted image data. When it is determined that the tone matches, the process of step S304 to step S306 of FIG. 3 is not performed, and the amount of data communicated between the client side and the server side can be reduced.

Fourth Embodiment

Hereinafter, a fourth embodiment will be described with reference to points different from the first to third embodiments. In the present embodiment, until the process for creating replacement image data is completed in step S391 of FIG. 3, the client side presents that the color conversion is being performed to the user.

Figure 6:
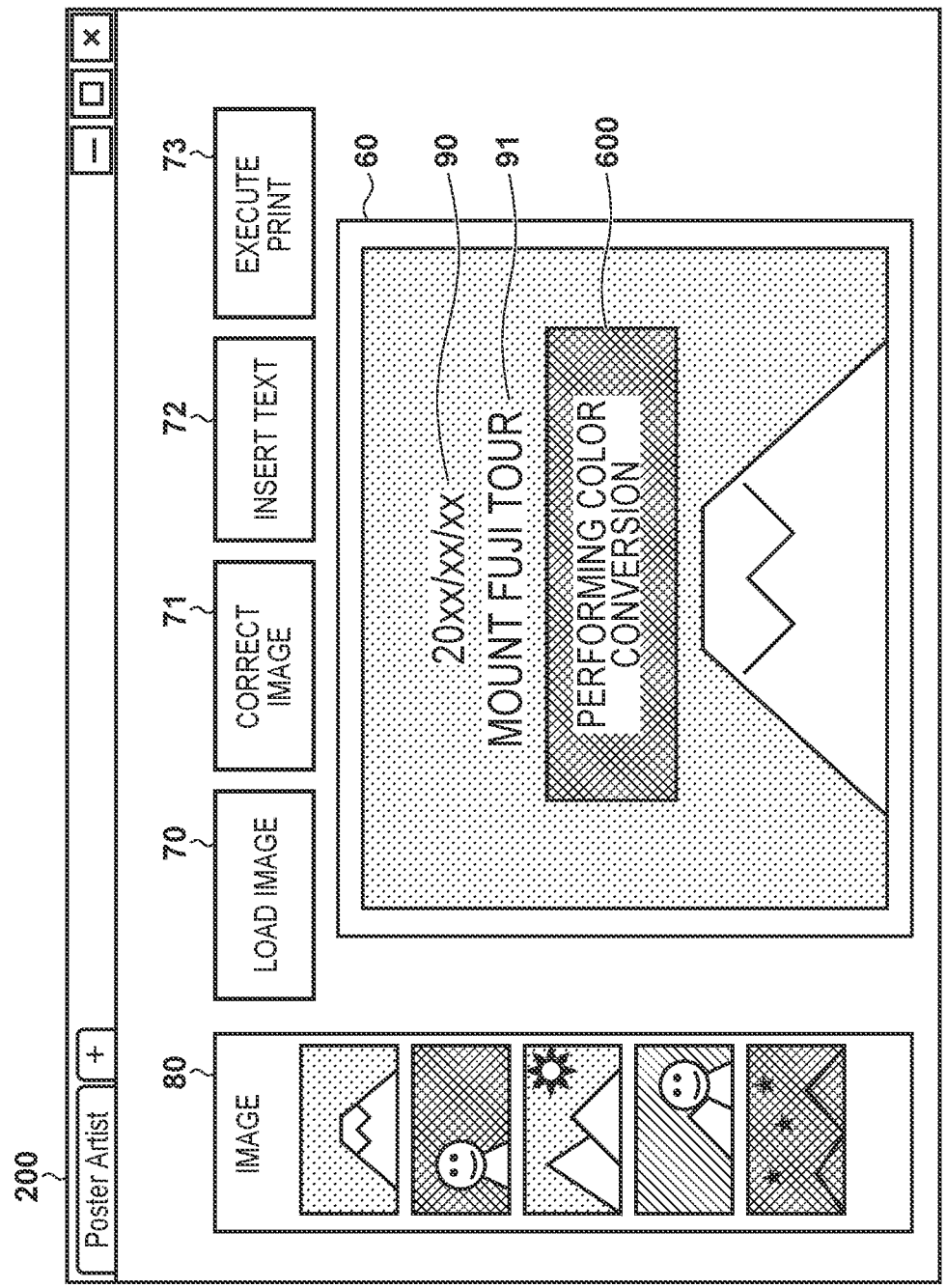
FIG. 6 is a view illustrating a user interface screen of a Web application.

FIG. 6 is a diagram illustrating an example of a UI screen of a Web application according to the present embodiment. A message 600 of FIG. 6 illustrates, on the preview region 60, a dialog display indicating to the user that color conversion is in progress on the server side. Upon detecting completion of the creation of the replacement image data 23 in step S305, the client-side program 53 cancels the display of the message 600, replaces the preview image data displayed in step S303, and displays the replacement image data 23 on the screen 200.

As described above, according to the present embodiment, the user can clearly recognize the timing at which to assess the tone the screen.

Fifth Embodiment

Hereinafter, a fifth embodiment will be described with reference to points different from the first to fourth embodiments. In the present embodiment, until the process for creating the replacement image data is completed in step S391 of FIG. 3, a restriction is imposed so that a print instruction cannot be accepted on the screen 200. For example, at the time of starting the processing of step S301, the client-side program 53 changes the shape or color of the button 73 to a grayed-out display or the like, and imposes a restriction so that an instruction that cannot be accepted from the user. When the processing of step S306 is completed, the client-side program 53 changes the button 73 to a state in which it can accept an instruction from the user.

FIG. 7 is a diagram illustrating an example of a UI screen of a Web application according to the present embodiment. As shown in FIG. 7, the coloration of the button 73 is made to be gray, and the button 73 is made to be such that a user operation such as a click cannot be accepted thereby.

As described above, according to the present embodiment, it is possible to prevent the acceptance of an accidental instruction by the user to execute printing, when not a timing at which the user can assess the tone on the screen.

Sixth Embodiment

Hereinafter, a sixth embodiment will be described with reference to points different from the first to fifth embodiments. In the present embodiment, in step S390 of FIG. 3, an example is assumed in which the image data transmitted from the client side is in the AdobeRGB color space (a first color space), and the color space reproduced by the monitor 5 is the AdobeRGB color space. Further, the printer 2 can print in the AdobeRGB color space. In such a case, it is desirable to print in AdobeRGB which has a wider color gamut than sRGB (second color space). Therefore, in this embodiment, in such a case, the color conversion in step S390 is skipped, and the replacement image data is generated in step S391 so as to maintain the AdobeRGB color gamut.

For example, in step S304, the client side may transmit sRGB and AdobeRGB setting information from the printer driver to the server side 1 together. When the obtained setting content is AdobeRGB, the server side 1 may skip the color conversion in step S390, and even when maintaining the color gamut in AdobeRGB, may create the replacement image data in step S391. In the above description, AdobeRGB is described as a first color space, and sRGB is described as a second color space; however, if the color gamut of the first color space is wider than the color gamut of the second color space, the operation of the present embodiment can be applied without being limited to the respective color spaces described above.

As described above, according to the present embodiment, the processing on the server side 1 of FIG. 3 can be controlled so that a more appropriate output result is obtained in accordance with the color space that can be output by the printer 2.

Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), air Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-127734, filed Aug. 3, 2021, which is hereby incorporated by reference herein in its entirety.

What is claimed is:

1. A system comprising a client that includes a Web browser and a server operable to provide a function of a Web application to the client, wherein
the client comprises
at least one memory and at least one processor which function as:
an obtainment unit configured to obtain image data to be printed from the Web application;
a first generation unit configured to, based on the obtained image data to be printed from the Web application, generate preview image data for which a first color-conversion process for causing a display on a display unit is performed;
a display control unit configured to cause a first preview image to be displayed on the display unit based on the preview image data generated by the first generation unit; and
a first transmission unit configured to transmit to the server the image data to be printed,
and the server comprises
at least one memory and at least one processor which function as:
a second generation unit configured to, based on the transmitted image data transmitted by the first transmission unit to be printed, generate color-converted image data for which a second color-conversion process for printing by a printing device is performed,
wherein the display control unit, based on the color-converted image data generated by the second generation unit being received by the client, causes a second preview image to be displayed based on the color-converted image data.

2. The system according to claim 1, wherein
the at least one processor of the client is configured to further function as:
a third generation unit configured to generate test preview image data for which the first color-conversion process is performed based on test image data; and
a second transmission unit configured to transmit to the server the test image data and the test preview image data generated by the third generation unit,
the at least one processor of the server is configured to further function as:
a fourth generation unit configured to, based on the test image data transmitted by the second transmission unit, generate color-converted test image data for which the second color-conversion process is performed;
a first comparison unit configured to compare a tone of the test preview image data transmitted by the second transmission unit and a tone of the color-converted test image data generated by the fourth generation unit; and
a third transmission unit configured to transmit to the client a result of the comparison by the first comparison unit, and
the at least one processor of the client is configured to further function as:

a first control unit configured to, based on the result of the comparison transmitted by the third transmission unit, control transmission of image data to be printed by the first transmission unit.

3. The system according to claim 2, wherein in a case where it is determined, as the result of the comparison, that the tone of the test preview image data and the tone of the color-converted test image data match, the first control unit controls the first transmission unit to not transmit the image data to be printed.

4. The system according to claim 3, wherein in a case where it is determined, as the result of the comparison, that the tone of the test preview image data and the tone of the color-converted test image data do not match, the first control unit controls the first transmission unit to transmit the image data to be printed.

5. The system according to claim 1, wherein
the at least one processor of the server is configured to further function as:
a fifth generation unit configured to generate color-converted test image data for which the second color-conversion process is performed based on test image data; and
a fourth transmission unit configured to transmit to the client the color-converted test image data generated by the fifth generation unit, and
wherein the at least one processor of the client is configured to further function as:
a sixth generation unit configured to, based on the color-converted test image data transmitted by the fourth transmission unit, generate test preview image data for which the first color-conversion process has been performed;
a color data obtainment unit configured to obtain color data displayed on a screen based on the test preview image data generated by the sixth generation unit;
a second comparison unit configured to compare a tone of the color-converted test image data and a tone of the color data obtained by the color data obtainment unit; and
a second control unit configured to, based on a result of the comparison by the second comparison unit, control transmission of image data to be printed by the first transmission unit.

6. The system according to claim 5, wherein the second control unit, in a case where it is determined, as the result of the comparison, that the tone of the color-converted test image data and the tone of the color data match, controls the first transmission unit to not transmit the image data to be printed.

7. The system according to claim 6, wherein the second control unit, in a case where it is determined, as the result of the comparison, that the tone of the color-converted test image data and the tone of the color data do not match, controls the first transmission unit to transmit the image data to be printed.

8. The system according to claim 1, wherein the display control unit, together with the first preview image, causes a message indicating that the color-converted image data is being generated to be displayed while generation of the color-converted image data is being performed by the second generation unit.

9. The system according to claim 1, wherein the display control unit makes acceptance of an instruction to execute printing impossible while generation of the color-converted image data is being performed by the second generation unit.

10. The system according to claim 1, wherein a color gamut of the color-converted image data is smaller than a color gamut of image data to be printed.

11. The system according to claim 10, wherein
in a case where the color gamut of the image data to be printed can be outputted by the printing device, the second generation unit does not generate the color-converted image data, and generates image data based on the color gamut of the image data to be printed, and
the display control unit, when the image data is generated by the second generation unit, causes the second preview image to be displayed based on the image data.

12. The system according to claim 10, wherein the color gamut of the color-converted image data is sRGB and the color gamut of the image data to be printed is AdobeRGB.

13. The system according to claim 1, wherein tone according to color management corresponding to the client and tone according to color management corresponding to the server are different.

14. The system according to claim 1, wherein one of the client and the server supports color management and the other does not support color management.

15. The system according to claim 1, wherein the obtainment unit obtains image data selected by a user on a user interface screen of the Web application as the image data to be printed.

16. The system according to claim 1, wherein the display control unit, by replacing the first preview image displayed on the display unit with the second preview image, causes the second preview image to be displayed on the display unit.

17. A method executed by a system comprising a client that includes a Web browser and a server operable to provide a function of a Web application to the client, wherein
the client
obtains image data to be printed from the Web application;
based on the obtained image data to be printed, generates preview image data for which a first color-conversion process for causing a display on a display unit is performed;
causes a first preview image to be displayed on the display unit based on the generated preview image data; and
transmits to the server the image data to be printed, and
the server
based on the transmitted image data obtained from the client to be printed, generates color-converted image data for which a second color-conversion process for printing by a printing device is performed, and
in the client, based on the color-converted image data being generated, causes a second preview image to be displayed based on the color-converted image data.

18. A method for controlling a client comprising a Web browser, the method comprising:

obtaining image data to be printed from the Web application;
based on the obtained image data to be printed, generating preview image data for which a first color-conversion process for causing a display on a display unit is performed; and
causing a first preview image to be displayed on the display unit based on the generated preview image data;
wherein after generation, based on the image data to be printed, of color-converted image data for which a second color-conversion process for printing by a printing device is performed, a second preview image is caused to be displayed on the display unit by replacing the first preview image displayed on the display unit with the second preview image which is based on the color-converted image data.

19. The method for controlling according to claim 18, wherein
the image data to be printed is transmitted to the server,
the color-converted image data is generated by the server based on the transmitted image data transmitted by the first transmission unit to be printed,
the color-converted image data generated by the server is received by the client, and
at least until the color-converted image data generated by the server is received by the client, the first preview image is displayed on the display unit.

20. The method for controlling according to claim 18, wherein
the method for controlling further comprises:
generating test preview image data for which the first color-conversion process is performed based on test image data;
transmitting to the server the test image data and the test preview image data generated by the third generation unit;
in a case where it is determined, as a result of comparing a tone of color-converted test image data for which the second color-conversion process is performed, which is generated on the server based on the test image data and a tone of the test preview image data, that the tone of the test preview image data and the tone of the color-converted test image data match, controlling to not transmit the image data to be printed to the server; and
in a case where it is determined, as the result of the comparison, that the tone of the test preview image data and the tone of the color-converted test image data do not match, controlling to transmit the image data to be printed to the server.

21. The method of controlling according to claim 18, wherein acceptance of an instruction to execute printing is made to be impossible while generation of the color-converted image data is being performed.

* * * * *